Figures 3, 4:
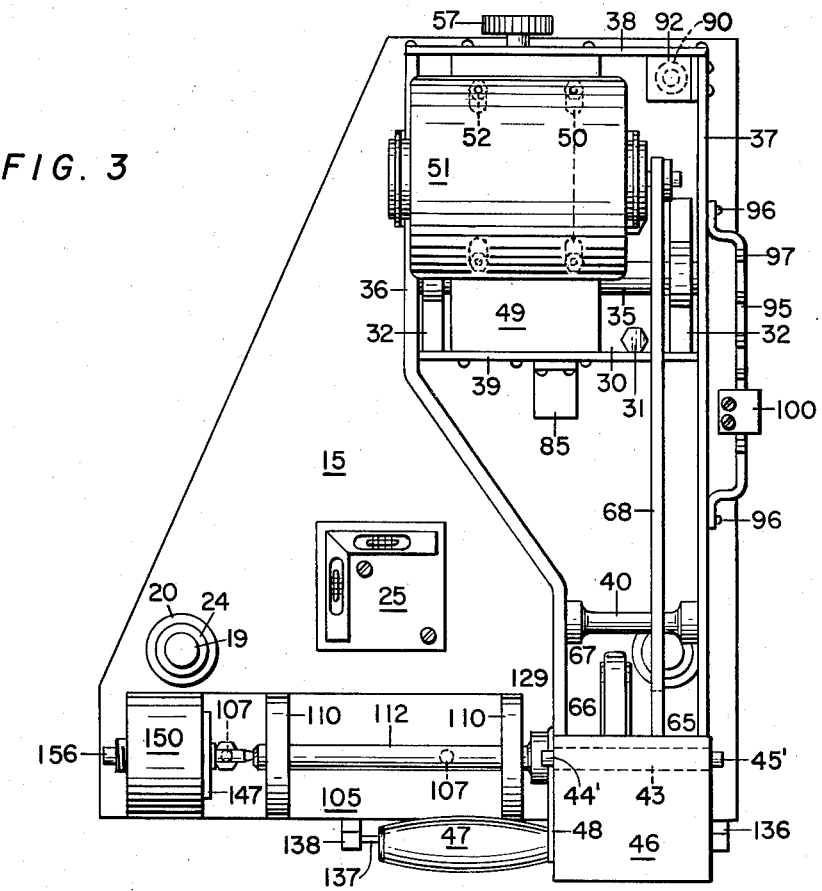

Sept. 18, 1956  J. E. BIRDSALL  2,763,152
BEARING TESTING DEVICE
Filed April 14, 1954  3 Sheets-Sheet 1
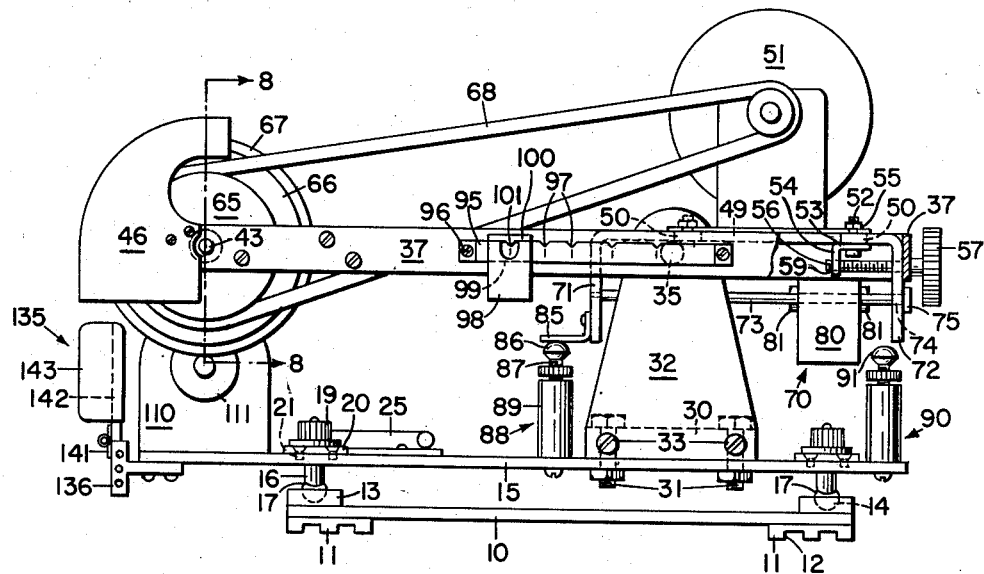
FIG. 1
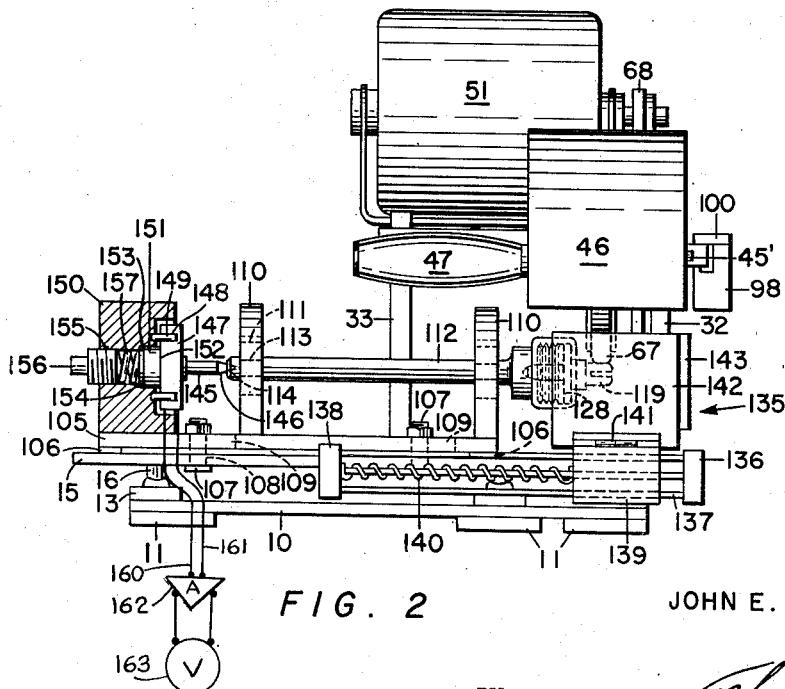
FIG. 2
INVENTOR
JOHN E. BIRDSALL
BY 
ATTORNEY Sept. 18, 1956 J. E. BIRDSALL 2,763,152
BEARING TESTING DEVICE
Filed April 14, 1954 3 Sheets-Sheet 2

INVENTOR
JOHN E. BIRDSALL
BY
ATTORNEY

Sept. 18, 1956  J. E. BIRDSALL  2,763,152
BEARING TESTING DEVICE
Filed April 14, 1954
3 Sheets-Sheet 3

INVENTOR
JOHN E. BIRDSALL
BY
ATTORNEY

United States Patent Office 2,763,152
Patented Sept. 18, 1956

2,763,152

BEARING TESTING DEVICE

John E. Birdsall, San Diego, Calif.

Application April 14, 1954, Serial No. 423,261

5 Claims. (Cl. 73—67)

(Granted under Title 35, U. S. Code (1952), sec. 266)

The invention described herein may be manufactured and used by or for the Government of the United States of America for governmental purposes without the payment of any royalties thereon or therefor.

The present invention relates to a bearing testing device and more particularly to a device for testing anti-friction bearings having inner and outer races wherein a means is provided for rotating the outer race of a bearing and another means is provided for supporting the inner race of the bearing and transmitting vibrations thereof to a suitable vibrations pickup means.

When the inner and outer races of an anti-friction bearing are rotated relative to one another, any imperfections in the bearing such as surface roughness and surface flaws of the balls and races, the presence of dirt, imperfect roundness of the balls, or eccentricity of the races are manifested as mechanical vibrations of the races of the bearing, and such vibrations may be measured to determine whether the bearing is suitable for use. Such vibrations have been measured in the past by manually feeling the vibrations and by listening to the sound picked up by a microphone placed near a bearing which is being tested. These methods have proved unsatisfactory since they depend on the differing physical reactions of individual operators, and therefore the human error involved makes it impossible to get consistently accurate results.

Diaphragm devices and seismic type pickups have also been employed to measure the vibrations of anti-friction bearings, but these devices have proven unsatisfactory due to the resonance characteristics of the devices and the difficulty of calibration thereof. Furthermore, prior art devices tend to pick up external undesired vibrations which destroy the accuracy of measurements taken therewith.

The present invention utilizes an arrangement wherein a means is provided for rotating the outer race of a bearing to be tested with a substantially constant force and the vibrations of the inner race thereof are accurately measured by electrical means such that it is merely necessary for the operator to take readings from the dial of a voltmeter, thereby reducing the possibility of human error to a minimum. The invention device may be readily calibrated, and due to the mass of the system, resonance difficulties are substantially eliminated. Means is also provided for preventing external vibrations from affecting the readings obtained with the invention device.

An object of the present invention is the provision of a new and novel bearing testing device wherein the human error involved in testing therewith is reduced to a minimum.

Another object is to provide a new and novel bearing testing device which is adapted to test different sizes of bearings and which may be quickly and easily operated.

A further object of the invention is the provision of a new and novel bearing testing device wherein the vibration measuring means is vibrationally insulated from external disturbances.

Still another object is to provide a new and novel bearing testing device which is simple and inexpensive in construction, yet sturdy and accurate in operation.

Figure 5:
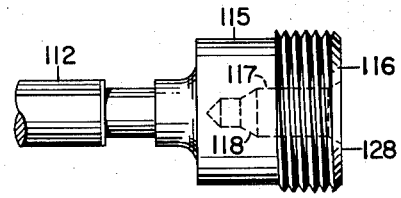
Figure 7:
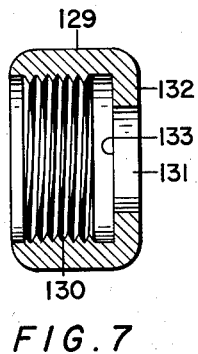
Figure 6:
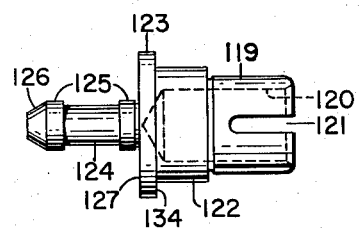
Figure 8:
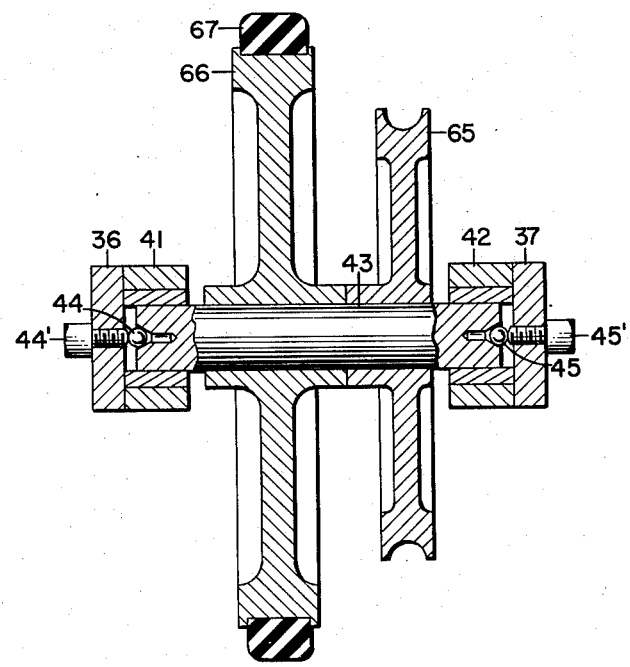

Other objects and many of the attendant advantages of this invention will be readily appreciated as the same becomes better understood by reference to the following detailed description when considered in connection with the accompanying drawings wherein:

Fig. 1 is a front view of the device, with a portion cut away for the purpose of illustration, Fig. 2 is a side view partly in section of the device shown in Fig. 1, Fig. 3 is a top view of the device shown in Fig. 1, Fig. 4 illustrates the assembly of certain components of the device, Fig. 5 shows an end portion of the transmitting shaft of the device, Fig. 6 shows the collet means utilized in the device, Fig. 7 is a sectional view of the locknut means of the device, and Fig. 8 is a sectional view of certain components of the device taken on the line 8—8 of Fig. 1 looking in the direction of the arrows.

Referring now to the drawings, wherein like reference characters designate like or corresponding parts throughout the several views, there is shown in Figs. 1 to 3 a plate member 10 having three vibration isolating rubber pads 11 formed of rubber or the like secured to the under side thereof, two of the units being located at the corners of the left end of the plate as seen in Fig. 1 and the other unit being located at the midportion of the opposite end of the plate. The vibration isolating pads are provided with grooves 12 which are adapted to prevent the transmission of vibrations to the plate from the surface upon which the pads rest. Three metallic blocks 13 are bolted to the plate immediately above each of pads 11 and have recessed portions 14 formed therein which are substantially hemispherical in configuration, a second plate 15 being supported on plate 10 by means of leveling screws 16 each having a rounded end portion 17 adapted to seat in one of recesses 14.

Referring now to Fig. 4, which illustrates the assembly and connection of leveling screws 16 to plate 15, it may be seen that screw 16 has a reduced portion 18 formed adjacent the top end thereof and that a cap member 19 is rotatably mounted on portion 18 but may not move axially with respect to member 16. An attaching member 20 is bolted by means of screws 21 to plate 15, and screw member 16 passes through a longitudinal passage 22 formed in member 20, the upper end of member 20 having screw threads formed on the outer periphery thereof. Cap 19 has complementary screw threads formed on the inner periphery thereof which engage the screw threads on member 20, and a lock nut member 24 is also threaded on the outer periphery of member 20. It is evident that by rotating cap 19 in opposite directions, plate 15 may be raised or lowered as desired. In this manner the position of plate 15 may be adjusted with respect to the position of plate 10 and it is evident that since rounded portions 17 of members 16 may freely pivot within recesses 14, plate 15 may be leveled regardless of the position of plate 10. A cross test level 25 is bolted to the upper surface of plate 15 to indicate when the plate is level.

A plate 30 is bolted to plate 15 by four bolts 31, only two of which are visible in Figs. 1 and 3, and two trunnions 32 are bolted to opposite ends of the plate by means of bolts 33. A shaft 35 is rotatably journaled in corresponding end portions of the two trunnions and passes therethrough, the outer ends of the shaft being suitably rigidly connected to members 36 and 37 of a frame means. One end of member 36 is connected to one end of member 37 by means of a member 38 which is bolted therebetween, a center-cross brace 39 being suitably connected between members 36 and 37, and a front cross brace 40 is also suitably connected between the members to thereby form a rigid frame.

As seen in Fig. 8, bearing blocks 41 and 42 are secured to the opposite ends of members 36 and 37 and a shaft 43 is rotatably journaled in said bearing blocks. The opposite ends of shaft 43 have conical seats formed centrally therein, and ball bearings 44, 45 are positioned within each of the seats. Set screws 44', 45' are mounted in members 36, 37 and are adapted to engage ball bearings 44 and 45, respectively, to adjust the amount of friction between the ball bearings and shaft 43. The manner in which shaft 43 is supported tends to isolate extraneous vibrations from the shaft. A guard member 46 comprising a suitably formed thin sheet of metal is bolted to the opposite ends of members 36, 37 and a handle 47 is bolted to an arm 48 which is in turn bolted to member 36.

A plate 49 is bolted between members 38 and 39 and has four slots 50 formed therethrough. An electric motor 51 or the like is mounted upon plate 49 and is secured thereto by four bolts 52 which pass through complementary openings in the base of the motor and slots 50, only two of said bolts being shown in Fig. 1. Nuts 55 are provided for clamping motor 51 rigidly to plate 49 when the motor is in the desired position. A plate 53 has openings therein through which the two bolts to the right of the motor as seen in Fig. 1 pass, and a downwardly extending flange 54 is formed integral therewith. An adjusting screw 56 has a hand wheel 57 secured at one end thereto, the screw passing through a complementary opening formed in member 37 and the opposite end of the screw having screw threads formed on the outer periphery thereof. The threads on member 56 are threaded within a correspondingly threaded opening 59 formed in flange 54.

Mounted on shaft 43 and secured thereto for rotation therewith are a pulley 65 and a wheel 66, the outer periphery of the wheel having an annular tire member 67 mounted thereon, member 67 being formed of a rubber or similar resilient material having a smooth outer periphery. A continuous belt 68 drivingly connects motor 51 to pulley 65, and it is evident that by loosening nuts 55 and turning hand wheel 57, the position of member 53 and the motor may be adjusted with respect to the frame thereby adjusting the tension of belt 68.

It should be noted that the entire frame and all of the components supported thereby are pivoted about the axis of shaft 35. In order for the device to operate properly, it is necessary that the frame and its associated components be as nearly as possible perfectly balanced about the axis of shaft 35. A balancing means indicated generally by numeral 70 is therefore provided to properly balance the frame and its associated components. Plate 49 has downwardly extending flanges 71 and 72 integrally formed on the opposite ends thereof, and two spaced guide rods 73 are supported therebetween, only one of the rods being visible in Fig. 1. An adjusting screw 74 is mounted midway between the two rods 73, the head 75 thereof being visible in Fig. 1. A weight 80 has three complementary passages formed therethrough, guide rods 73 passing through the two outer passages, and screw 74 passing through the intermediate passage. Screw 74 has a threaded outer periphery and the inner periphery of the intermediate passage in weight 80 is correspondingly threaded whereby the position of the weight may be adjusted by rotating screw 74. Lock nuts 81 are threaded on screw 74 for locking the weight in any desired position.

A bracket 85 is bolted to flange 71 and is adapted to engage a rounded upper surface 86 formed on screw 87 of a bumper assembly indicated generally by reference numeral 88. Screw 87 has screw threads formed on the outer periphery thereof and is threaded into a bumper cylinder 89 which has corresponding screw threads formed on the inner periphery thereof. Cylinder 89 is bolted to plate 15, and by rotating screw 87 with respect to cylinder 89, the position of surface 86 may be selectively adjusted thereby limiting the pivotal movement of the frame in one direction as determined by the position at which bracket 85 engages surface 86. A second bumper 90 similar to bumper assembly 88 is provided with a curved upper surface 91 which is adapted to engage a gusset 92 bolted to member 37 to prevent excessive pivotal movement of the frame in a clockwise direction as seen in Fig. 1.

When the device has been assembled and weight 80 properly adjusted such that the frame and its associated components are balanced about the axis of shaft 35, it is desirable to have a means whereby the pressure which the wheel 66 and tire 67 exert on the outer race of the bearing to be tested may be quickly and accurately varied. Accordingly, a bracket 95 is bolted at its opposite ends to a lateral portion of member 37 by means of bolts 96, member 95 having a plurality of notches 97 spaced along the upper edge thereof. A weight member 98 has a slot 99 formed therethrough adapted to receive member 95, and a cap member 100 is bolted thereto and extends at right angles thereto such that the lower surface of member 100 is adjacent the upper edge of member 95, a tapered ridge 101 being formed integral with the lower surface of member 100 and adapted to be positioned within one of the notches 97 to secure the weight in the proper position.

It is evident that the weight may be lifted such that ridge 101 is disengaged from one of the notches 97 and may be moved to another position whereupon it may be lowered such that edge 101 lies within another of the notches. In this manner the pressure which wheel 66 and tire 67 exert on the outer race of the bearing to be tested may be selectively varied.

Referring more particularly to Fig. 2, there is shown a plate 105 which is spaced from plate 15 by means of thin pads 106 formed of rubber or similar vibration isolating material, the pads being located adjacent opposite ends of plate 105. Plate 105 is secured in position relative to plate 15 by means of bolts 107 which pass through suitable openings 108 in plate 15 and elongated slots 109 in plate 105. Two spaced support members 110 are fixed to plate 105, each support member having a disk shaped rubber bushing 111 mounted within a complementary opening formed centrally through each support member, the bushing being preferably formed of rubber or similar vibration isolating material. A rigid transmission shaft 112 formed of steel or the like is provided with reduced portions 113 which are mounted within bushings 111, the left end of shaft 112 being provided with a tapered seat 114. Shaft 112 is preferably formed of metallic material which readily transmits vibrations, but may also be composed of other suitable vibration transmitting material.

Referring to Fig. 5, it may be seen that the right end of shaft 112 is provided with a first enlarged portion 115 and a second enlarged portion 116 having screw threads formed on the outer periphery thereof, an opening 117 being provided in the end of the shaft and having a tapered end portion 118.

Referring now to Fig. 6, there is shown a collet means comprising a resilient cylindrical end portion 119 having a cylindrical cavity 120 formed longitudinally therethrough. Four slots 121 are equally spaced about the outer periphery of portion 119, the slots communicating with cavity 120 and extending longitudinally along portion 119 such that the inner race of a bearing may be fitted over portion 119 and the various segments will tend to expand within said inner race locking it securely in position and preventing rotation thereof. An enlarged portion 122 is formed integral with portion 120 and an annular shoulder 123 is provided on portion 122. A projection 124 formed integral with portion 122 has two spaced outer surfaces 125 adapted to engage the inner surface of opening 117 in shaft 112, and also has a tapered end portion 126 adapted to engage the tapered portion 118 of opening 117. It is thus seen that projection 124 fits within opening 117, and that surface 127 of the collet means engages surface 128 of portion 116.

Fig. 7 shows a sectional view of the locknut 129 employed to secure the collet means to the end of the transmitting shaft. A cylindrical cavity 130 is formed within member 129, and an opening 131 is formed in end wall 132 thereof. Cavity 130 has screw threads formed on the inner periphery thereof adapted to engage complementary screw threads formed on the outer periphery of portion 116, and when the locknut is in assembled position as shown in Fig. 2, these complementary screw threads are in engagement such that surface 133 of wall 132 abuts surface 134 of shoulder 123 of the collet means whereby the collet is rigidly secured to the end of shaft 112.

As seen in Fig. 2, it is evident that if the inner race of an antifriction bearing is placed upon portion 119 of the collet, the inner race will be held stationary and that the outer race is adapted to be engaged by tire 67 mounted on wheel 66 whereby the outer race may be rotated by motor 51. A shield assembly indicated generally by reference numeral 135 is provided for protecting the operator from possible injury by materials which may be thrown outwardly by the rotating bearing and comprises a bracket 136 bolted to base member 15 and three spaced rods 137 which are supported between bracket 136 and a bracket 138 also suitably bolted to plate 15. A block member 139 has three passages formed therethrough and the corresponding rods 137 extend through these passages, a compression spring 140 being positioned about one of the rods and urging block 139 to the right into the position shown in Fig. 2. A hinge 141 has one portion bolted to block 139 and a second portion bolted to a shield member 142 formed of transparent material such as Plexiglas or the like. A hand guard member 143 is suitably secured to one end portion of member 142 and is formed of a similar material. Suitable spring means (not shown) is provided to pivot the integral shield and guard members into the position shown in Fig. 1. It is apparent that the shield member normally protects the operator and that when it is desired to place a bearing on the collet means or to remove a bearing therefrom it is merely necessary to exert pressure on member 143 thereby urging member 139 and the associated shield means to the left as seen in Fig. 2 along rods 137 against the force of spring 140.

The tapered seat 114 formed in the left end of shaft 112 is adapted to receive a correspondingly tapered probe of a vibration pickup device. The vibration pickup utilized in the present invention comprises a rigid metallic shaft 145 having a tapered end portion 146 which is seated in recess 114, the opposite end of shaft 145 being rigidly connected to disk-shaped piezoelectric crystal 147 having two openings 148 located at diametrically opposite points adjacent the outer periphery thereof. Two supporting studs 149 are mounted upon housing 150 which is bolted to member 105 and the studs extend into openings 148 such that the crystal is firmly supported thereby. The studs are formed of rubber or the like such that the crystal is vibrationally insulated from housing 150 and the associated supporting members. A backing pad 151 formed of rubber or the like engages surface 152 of the crystal and a plate 153 is positioned between pad 151 and a shoulder 154 formed in the housing. A passage 155 extends longitudinally through the housing and has screw threads formed on the inner periphery thereof, an adjusting screw 156 being threaded within passage 155 and a spring 157 being positioned between the adjusting screw and plate 153. It may be seen that crystal 147 is slidably mounted on supporting studs 149 and that by actuating screw 156 the pressure which portion 146 of shaft 145 exerts on seat 114 may be selectively adjusted. Suitable leads 160 and 161 may be attached to the opposite faces of crystal 147 whereby voltages proportional to vibrations in the crystal may be taken therefrom in a well known manner.

The output voltages of the crystal are fed into a conventional electronic amplifier 162 and the amplified output voltages of the amplifier are then fed into a conventional voltmeter 163, the degree of accuracy of readings thus obtained being determined by the scale value selected for use on the voltmeter. The standard by which a bearing is accepted or rejected is determined by voltage readings established by inspection of a number of bearings.

A high impedance microphone of the crystal type is shown as being employed as the vibration pickup means in the present invention; however, it should be understood that various other types of vibration pickups may be employed provided that a suitable means such as members 149 and 151 is furnished for resiliently mounting the pickup to vibrationally insulate the pickup from external vibrations. A suitable means such as member 156 must also be provided for adjusting the pressure of the pickup probe against shaft 112. Various types of conventional amplifiers may be utilized for amplifying the output voltages of the vibration pickup and although it is considered preferable to measure such voltages with a voltmeter, it is also feasible to employ head phones whereby an audio indication may be obtained rather than a visible indication.

In operation, a suitable collet for the bearing which is desired to be tested is first selected and then attached to shaft 112 by means of nut 129. Weight 80 is adjusted to balance the pivoted frame about the axis of shaft 35 and weight 98 is then adjusted to a position which provides the desired pressure on the outer race of the bearing to be tested. Bumpers 88 and 90 are then adjusted to limit the pivotal movement of the frame, bumper 88 being adjusted such that the frame as seen in Fig. 1 may rotate in a counterclockwise direction only to a point where the outer periphery of tire 67 engages the outer periphery of the collet means to prevent damage to the collet means. Motor 51 is then started and pulley 65 and wheel 66 are rotated through the intermediary of belt 68. Handle 47 is then grasped and the frame rotated clockwise as seen in Fig. 1 and a bearing inserted on end portion 119 of the collet means. The frame is then lowered until tire 67 of wheel 66 engages the outer race of the bearing to be tested which causes the outer race to revolve. The inner race of the bearing is held rotationally stationary and the vibrations generated in the bearing are transmitted through the collet means and shaft 112 to probe 145 of the vibration pickup whereupon the vibrations are converted into electrical voltages which are in turn amplified and fed into a voltmeter where a visual indication is obtained of the magnitude of the vibrations present in the bearing. It should be noted that external vibrations are prevented from influencing the operation of the device by means of the pads 11 secured to base 10, pads 106, bushings 111, studs 149 and pad 151.

It is evident that bearings to be tested may be quickly and easily inserted upon the collet means and that vibrations of the bearing are transmitted through rigid shaft 112, and thereby faithfully reproduced in the vibration pickup means giving consistently accurate results.

From the foregoing, it is apparent that there is provided a new and novel bearing testing device wherein the human error involved in testing is reduced to a minimum. The device is adapted to test different sizes of bearings and may be quickly and easily operated. The device is also simple and inexpensive in construction, yet sturdy and accurate in operation, and the vibration measuring means thereof is vibrationally insulated from external disturbances.

Obviously many modifications and variations of the present invention are possible in the light of the above teachings. It is therefore to be understood that within the scope of the appended claims the invention may be practiced otherwise than as specifically described.

I claim:

1. A device for testing antifriction bearings having inner and outer races which comprises base means, frame means pivotally supported by said base means, a motor mounted on said frame means, a pulley and a wheel drivingly connected to one another and each being rotatably supported by said frame means, means drivingly connecting said pulley to said motor, means for moving said wheel into engagement with the outer race of an antifriction bearing, transmitting means supported by said base means and including a rigid shaft having a collet means connected to one end thereof and vibration pickup means connected to the opposite end thereof, said collet means being adapted to engage the inner race of said bearing, said shaft being mounted in rubber bushings to thereby vibrationally insulate the shaft from said base means, balance means supported by said frame for balancing said frame about its pivotal axis, and pressure adjusting means connected to said frame for adjusting the pressure which said wheel exerts on the outer race of said bearing.

2. A device as defined in claim 1 including a plurality of guide rods supported by said frame, said balance means comprising a weight member slidably mounted on said guide rods, said weight member having a threaded opening formed therein, an adjusting screw being threaded within said threaded opening for adjusting the position of said weight member relative to said frame, and lock means connected to said adjusting screw for maintaining said weight member in adjusted position.

3. A device as defined in claim 1 wherein said pressure adjusting means comprises a bracket connected to said frame, a weight member slidably mounted on said bracket, and cooperating means formed on said bracket and said weight member for maintaining said weight member in a desired position.

4. A device for testing antifriction bearings having inner and outer races which comprises base means, frame means pivotally supported by said base means, a motor mounted on said frame means, a pulley rotatably mounted on said frame and drivingly connected to said motor by means of a belt, a wheel rotatably mounted on said frame and connected for rotation with said pulley, said wheel having a tire of soft resilient material mounted on the outer periphery thereof, means for moving said tire into engagement with the outer periphery of an antifriction bearing, transmitting means including a rigid shaft mounted in rubber bushings and having collet means connected to one end thereof, the opposite end of said rigid shaft having a tapered recess formed therein, a probe member having one end thereof tapered and seated within said recess, the opposite end of said probe member being rigidly connected to a piezoelectric crystal mounted independently of said rigid shaft, and means for resiliently mounting said crystal.

5. A device as defined in claim 4 wherein said last-mentioned means includes a housing having an opening disposed in an end portion thereof, a plurality of resilient studs disposed within said opening and connected to said housing, a plurality of openings formed within said crystal, said studs being disposed within said openings, and means for selectively adjusting the pressure exerted by said probe member on said rigid shaft.

References Cited in the file of this patent

UNITED STATES PATENTS

| | | |
|---|---|---|
| 1,346,400 | Dover | July 13, 1920 |
| 1,850,056 | Abbott | Mar. 15, 1932 |
| 1,871,992 | Heuze | Aug. 16, 1932 |
| 2,464,662 | Young | Mar. 15, 1949 |
| 2,478,663 | Masket et al. | Aug. 9, 1949 |
| 2,556,489 | Beeker | June 12, 1951 |
| 2,608,090 | Barker et al. | Aug. 26, 1952 |